(12) United States Patent
Muraki

(10) Patent No.: US 7,830,447 B2
(45) Date of Patent: Nov. 9, 2010

(54) IMAGING APPARATUS INCLUDING A PLURALITY OF IMAGE PICKUP ELEMENTS

(75) Inventor: Jun Muraki, Hamura (JP)

(73) Assignee: Casio Computer Co., Ltd., Tokyo (JP)

( * ) Notice: Subject to any disclaimer, the term of this patent is extended or adjusted under 35 U.S.C. 154(b) by 954 days.

(21) Appl. No.: 11/502,754

(22) Filed: Aug. 11, 2006

(65) Prior Publication Data

US 2007/0064116 A1 Mar. 22, 2007

(30) Foreign Application Priority Data

Sep. 16, 2005 (JP) ............................. 2005-269713

(51) Int. Cl.
*G03B 7/00* (2006.01)
*H04N 5/235* (2006.01)

(52) U.S. Cl. .................................... 348/362; 348/221.1

(58) Field of Classification Search ........................ None
See application file for complete search history.

(56) References Cited

U.S. PATENT DOCUMENTS

| | | | | |
|---|---|---|---|---|
| 5,638,119 | A * | 6/1997 | Cornuejols | 348/229.1 |
| 6,529,640 | B1 * | 3/2003 | Utagawa et al. | 382/284 |
| 6,661,451 | B1 * | 12/2003 | Kijima et al. | 348/220.1 |
| 6,930,716 | B2 * | 8/2005 | Yoshida | 348/322 |
| 2001/0007473 | A1 * | 7/2001 | Chuang et al. | 348/362 |
| 2002/0030749 | A1 * | 3/2002 | Nakamura et al. | 348/220 |
| 2003/0020814 | A1 * | 1/2003 | Ono | 348/220.1 |
| 2003/0072566 | A1 * | 4/2003 | Pastre | 396/20 |
| 2006/0044408 | A1 * | 3/2006 | Nishizawa | 348/222.1 |

FOREIGN PATENT DOCUMENTS

| JP | 64-7542 B2 | 2/1989 |
|---|---|---|
| JP | 11-4326 A | 1/1999 |
| JP | 2000-201288 A | 7/2000 |
| JP | 2001-275127 A | 10/2001 |

OTHER PUBLICATIONS

Chinese Office Action dated Jan. 9, 2009 (8 pages), and English translation thereof (11 pages), issued in counterpart Chinese Application Serial No. 2006101291349.

* cited by examiner

*Primary Examiner*—Jason Whipkey
*Assistant Examiner*—Dennis Hogue
(74) *Attorney, Agent, or Firm*—Holtz, Holtz, Goodman & Chick, PC

(57) ABSTRACT

An imaging apparatus comprising a spectroscopy section for splitting a beam of object light; a first image pickup element and a second image pickup element for converting one of the object light split by the spectroscopy section to image data; a moving picture imaging control section for imaging a moving picture of the object using one image pickup element of the first image pickup element or the second image pickup element; a first still-image photographing control section for photographing a still image of the object using the first image pickup element and the second image pickup element; and a first recording control section for generating single still-image data by synthesizing still-image data acquired by the first image pickup element and still-image data acquired by the second image pickup element according to the first still-image photographing control section and for recording the generated single still-image data to a record section.

13 Claims, 3 Drawing Sheets

IMAGING APPARATUS INCLUDING A PLURALITY OF IMAGE PICKUP ELEMENTS

CROSS-REFERENCE TO RELATED APPLICATION

This application is based upon and claims the benefit of prioritey from the prior Japanese Patent Application No. 2005-269713, filed Sep. 16, 2005, the entire contents of which is incorporated herein by reference.

BACKGROUND OF THE INVENTION

1. Field of the Invention

The present invention relates to an imaging apparatus having a plurality of image pickup elements that can be used in a digital camera and to an imaging method.

2. Description of the Related Art

In an imaging apparatus, for example, a television camera, an art to use two image pickup elements to synthesize two image data acquired by the two image pickup elements thereby acquiring a single image data is known.

SUMMARY OF THE INVENTION

In accordance with an aspect of the present invention, there is provided an imaging apparatus comprising: a spectroscopy section for splitting a beam of object light; a first image pickup element for converting one of the object light split by the spectroscopy section to image data; a second image pickup element for converting the other object light split by the spectroscopy section to image data; a moving picture imaging control section for imaging a moving picture of the object using one image pickup element of the first image pickup element or the second image pickup element; a first still-image photographing control section for photographing a still image of the object using the first image pickup element and the second image pickup element; and a first recording control section for generating single still-image data by synthesizing still-image data acquired by the first image pickup element and still-image data acquired by the second image pickup element according to the first still-image photographing control section and for recording the generated single still-image data to a record section.

In accordance with another aspect of the present invention, there is provided an imaging apparatus comprising: a spectroscopy section for splitting a quantity of object light asymmetrically; a first image pickup element for converting the object light with a smaller quantity of light out of the light split by the spectroscopy section to image data; a second image pickup element for converting the object light with a larger quantity of light out of the light split by the spectroscopy section to image data; a moving picture imaging control section for imaging a moving picture of the object by pixel addition driving of the first image pickup element; and a still-image photographing and recording control section for photographing a still image of the object using the second image pickup element, and recording the acquired still-image data to a record section.

In accordance with another aspect of the present invention, there is provided an imaging method of an imaging apparatus comprising: a spectroscopy section for splitting a beam of object light; a first image pickup element for converting one of the object light split by the spectroscopy section to image data; and a second image pickup element for converting the other object light split by the spectroscopy section to image data; the method comprising: a moving picture imaging step of imaging a moving picture of the object using one image pickup element of the first image pickup element or the second image pickup element; a still-image photographing step of photographing a still image of the object using the first image pickup element and the second image pickup element; and a recording step of generating single still-image data by synthesizing still-image data acquired by the first image pickup element and still-image data acquired by the second image pickup element according to the still-image photographing step, and recording the generated single still-image data to a recording medium.

In accordance with another aspect of the present invention, there is provided an imaging method of an imaging apparatus comprising: a spectroscopy section for splitting a quantity of object light asymmetrically; a first image pickup element for converting the object light with a smaller quantity of light out of the light split by the spectroscopy section to image data; a second image pickup element for converting the object light with a larger quantity of light out of the light split by the spectroscopy section to image data; the method comprising: a moving picture imaging step of imaging a moving picture of the object by pixel addition driving of the first image pickup element; and a still-image photographing and recording step of photographing a still image of the object using the second image pickup element and recording the acquired still-image data to a recording medium.

In accordance with another aspect of the present invention, there is provided a program executed by a processor in an imaging apparatus, comprising: a spectroscopy section for splitting a beam of object light; a first image pickup element for converting one of the object light split by the spectroscopy section to image data; and a second image pickup element for converting the other object light split by the spectroscopy section to image data; the program comprising: a moving picture imaging processing step of imaging a moving picture of the object using one image pickup element of the first image pickup element or the second image pickup element; a still-image photographing processing step of photographing a still image of the object using the first image pickup element and the second image pickup element; and a recording processing step of generating single still-image data by synthesizing still-image data acquired by the first image pickup element and still-image data acquired by the second image pickup element according to the still-image photographing processing, and recording the generated single still-image data to a recording medium.

In accordance with another aspect of the present invention, there is provided a program executed by a processor in an imaging apparatus, comprising: a spectroscopy section for splitting a quantity of object light asymmetrically; a first image pickup element for converting the object light with a smaller quantity of light out of the light split by the spectroscopy section to image data; a second image pickup element for converting the object light with a larger quantity of light out of the light split by the spectroscopy section to image data; the program comprising: a moving picture imaging processing step of imaging a moving picture of the object by pixel addition driving of the first image pickup element; and a still-image photographing and recording processing step of photographing a still image of the object using the second image pickup element and recording the acquired still-image data in a recording medium.

The above and further novel features of the present invention will more fully appear from the following detailed description when the same is read in conjunction with the accompanying drawings. It is to be expressly understood, however, that the drawings are for the purpose of illustration only and are not intended as a definition of the limits of the invention.

DETAILED DESCRIPTION OF THE PREFERRED EMBODIMENTS

Hereinafter, the preferred embodiments of the present invention will be described with reference to the drawings as an example of application of an imaging apparatus of the present invention to a digital camera.

A. Configuration of the Digital Camera

Figure 1:
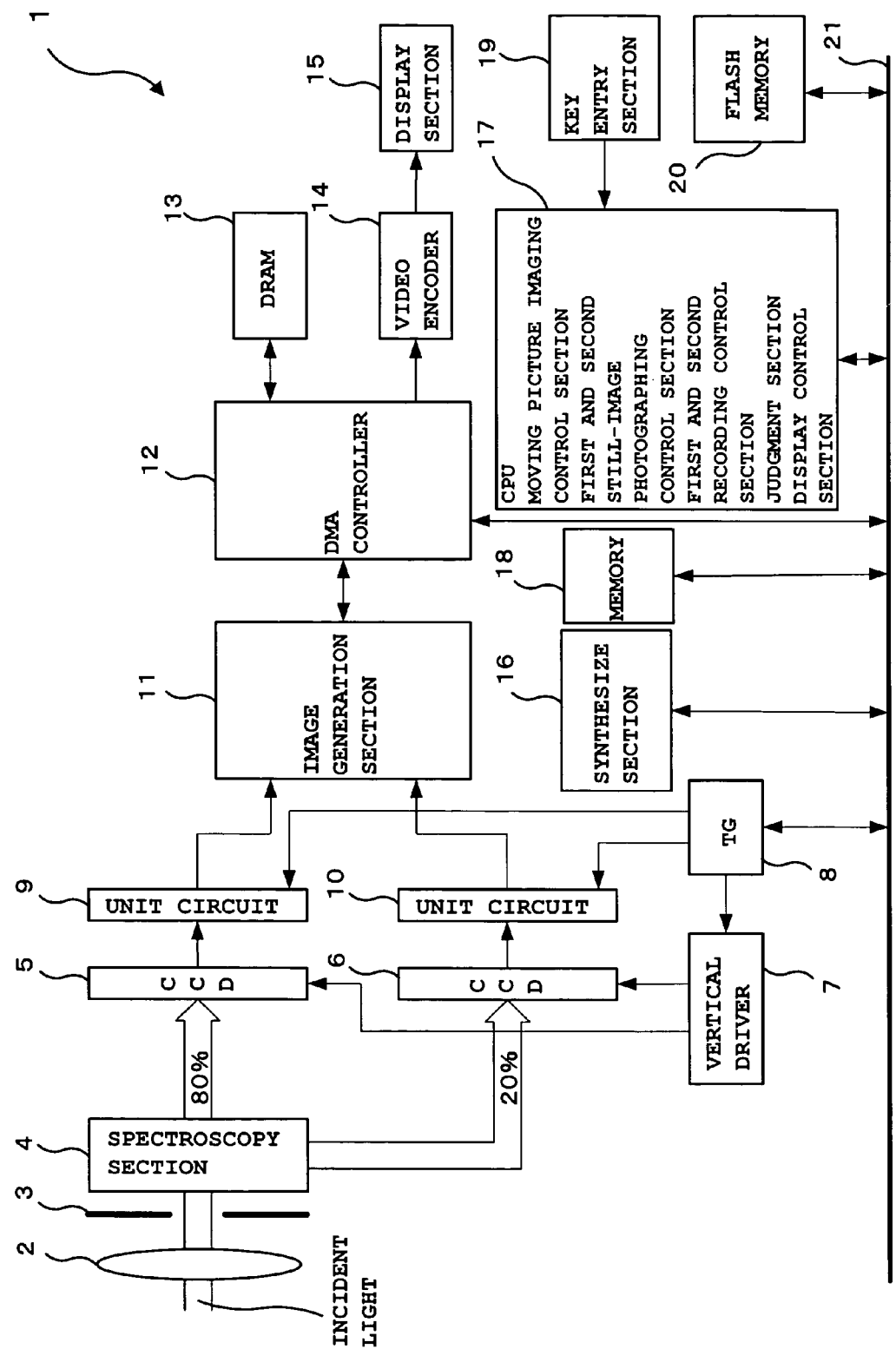
FIG. 1 is a block diagram of a digital camera in an embodiment of the present invention.

FIG. 1 is a block diagram showing the general electrical outline configuration of a digital cameral 1 which actualizes the imaging apparatus of the present invention.

The digital camera 1 includes an image pickup lens 2, an aperture/shutter combination 3, a CCD 4, a CCD 5, a vertical driver 7, a timing generator (TG) 8, a unit circuit 9, a unit circuit 10, an image generation section 11, a DMA controller 12, a DRAM 13, a video encoder 14, a display section 15, a synthesize section 16, a CPU 17, a memory 18, a key input section 19, a flash memory 20, and a bus 21.

The image pickup lens 2 includes a focus lens and a zoom lens and forms an image focus of object light on an acceptance surface of the CCD 5 and the CCD 6. The image pickup lens is connected to a lens driver circuit, not shown, which moves the focus lens and the zoom lens in the optical axis direction, respectively, according to a control signal from the CPU 17.

The aperture/shutter combination 3 includes a driver circuit, not shown, which operates the aperture/shutter combination according to control signals sent from the CPU 17. This aperture/shutter combination functions as both an aperture and a shutter.

The aperture functions as the mechanism to control the quantity of light incident from the image pickup lens 2. The shutter functions as the mechanism to control the time duration for applying light to the CCD 5 and the CCD 6. The time duration for applying light to the CCDs changes according to the opening and closing speed of the shutter (shutter speed). Thus, an exposure can be determined according to the aperture and shutter speed.

A spectroscopy section (spectroscopy means) 4 is configured with an optical element such as a prism and a half mirror. It splits a quantity of object light incident via the image pickup lens 2 into two at a certain ratio, and the split object light is projected to the CCD 5 and the CCD 6, respectively. The spectroscopy section 4 herein projects the light incident via the image pickup lens to the CCD 5 and CCD 6 at the ratio of the quantity of light,4 to 1 (asymmetrically). In other words, when the quantity of light incident to the spectroscopy section 4 is assumed to be 100%, the quantity of the light projected by the spectroscopy section 4 to the CCD 5 is 80% and the quantity of the light projected by the spectroscopy section 4 to the CCD 6 is 20%.

The CCD 5 and the CCD 6 (the image pickup elements), scan-driven by the vertical driver 7 respectively, photo-electrically convert the intensity of light of the respective colors of the RGB value of an object image at a constant frequency and outputs to the unit circuit 9 and the unit circuit 10, respectively. The operation timing of the unit circuit 9 and the unit circuit 10 is controlled by the CPU 17 via the TG 8.

The unit circuit 9 and the unit circuit 10 are configured with a correlated double sampling (CDS) circuit for performing and holding correlated double sampling of imaging signals (image data) that are respectively outputted from the CCD 5 and the CCD6, an automatic gain control (AGC) circuit for performing automatic gain control of the sampled imaging signals, and an analog to digital (A/D) converter for converting the automatic-gain-controlled analog signals. The imaging signals of the CCD 5 and the CCD 6 are sent as digital signals to the image generation section 11 via the unit circuit 9 and the unit circuit 10.

The image generation section 11 performs image processing including pixel interpolation processing, gamma (γ) correction processing, white balance processing, and generation processing of luminosity color difference signals (YUV signals) or the like to respective image data sent from the unit circuit 9 and the unit circuit 10.

The DMA controller 12 executes the transfer of data between the image generation section 11 and the DRAM 13, between the DRAM 13 and the video encoder 14 and between the DRAM 13 and the bus 21.

The DRAM 13 is a type of rewritable semiconductor used as a buffer memory to temporarily store the image data picked up by the CCD 5 and the CCD 6 (YUV data generated in the image generation section) and also as a working memory for the CPU 17.

The video encoder 14 converts the image data of the digital signals read out from the DRAM 13 into analog signals and outputs in sequence at a timing according to the scan mode of the display section 15.

The display section 15 includes a color liquid crystal display (LCD) and the driver circuit therefor. It displays the image data picked up by the CCD in the photography mode, and displays the image data read out from the flash memory 20 and expanded during reproduction.

The synthesize section 16 generates single still-image data by synthesizing still-image data (YUV data) picked up by the CCD 5 and still-image data (YUV data) picked up by the CCD 6.

The CPU 17 is a one-chip microcomputer which controls each section of the digital camera 1 described above. The CPU 17 has functions of performing compression and expansion processing of the image data (YUV data) (for example, compression and expansion of the joint photographic experts group (JPEG) format and the moving picture experts group (MPEG) format) and performing recording processing of the compressed data on the flash memory 20. Note that the CPU 17 functions as a moving picture imaging control section, first and second still-image photographing control section, first and second recording control section, a judgment section and a display control section.

Control programs and data required to control each section of the CPU 17 are recorded in the memory 18, and the CPU 17 operates in accordance with the control program.

The key input section 19 includes a plurality of operation keys, such as a mode selection key, a shutter button allowing both half pressing and full pressing and a record button, which outputs an operation signal corresponding to a key operation of a user to the CPU 17.

The flash memory 20 is a record medium for storing image data (still-image data and moving picture data), etc. picked up by the CCD 5.

B. Operation of the Digital Camera 1

Next, the operation of the digital camera 1 in the embodiment will be explained according to the flowchart in FIG. 2.

When the mode is set to the photography mode by operation by a user of the mode selection key of the key input section 19, the CPU17 starts driving of the CCD 6 by pixel addition driving of the CCD 6 to which a smaller quantity of incident light is projected under control of the vertical driver 7 via the TG 8 (Step S1).

Next, the CPU 17 performs image processing to the image data sequentially outputted (read out) from the CCD 6 and stores the image data in the buffer memory (DRAM 13), and displays the stored image data sequentially on the display section 15. This is referred to as through-image display (Step S2).

Herein, the quantity of object light projected to the CCD 6 is made to one fifth (one fifth of the quantity of light incident to the spectroscopy section) by the spectroscopy section. Therefore, even when the image data is read out by pixel addition driving, electric charges of pixels are less likely to become saturated and it is possible to increase a frame rate.

Conventionally, pixel addition driving has been performed to increase the frame rate. However, performing pixel addition driving is likely to cause a saturated state. (For example, when comparing a 4-pixel addition driving and all-pixel read-out driving (normal read-out driving), the electric charge quantity read out by the 4-pixel addition driving is four times of that read out by all-pixel read-out driving, which is likely to cause a saturated state.) Accordingly, an exposure time is reduced using an electronic shutter to prevent the saturated state. However, a short exposure time leads to lack of continuity between frames, thereby creating an unnatural through image (moving picture image).

However, according to the through-image display as described above, the spectroscopy section 4 for splitting the quantity of light into two at a certain rate is provided, and the through image of the object is displayed using the CCD to which a smaller quantity of light is projected. This enables performing pixel addition driving without shortening the exposure time, thereby increasing the frame rate and displaying a natural and smooth through image (moving picture image).

After starting the through-image display, the CPU 17 judges whether or not the shutter button has been depressed by the user (Step 3). The judgment is made based on whether or not a manipulation signal corresponding to the depression of the shutter button has been sent from the key input section 19.

If judged that the shutter button has not been depressed in Step S3, the CPU 17 judges whether or not to start picture recording (Step S4). The judgment is made based on whether or not a manipulation signal corresponding to the depression of the record button has been sent from the key input section 19.

If judged not to start picture recording in Step S4, the process returns to Step S3.

On the other hand, if judged that the shutter button has been depressed in Step S3, the CPU 17 performs still-image photographing processing using both CCDs simultaneously (Step S5). Specifically, the CCD 5 and the CCD 6 are exposed to light simultaneously, the CPU 17 drives the CCD 5 and the CCD 6 by driving of reading out charges of all pixels, performs image processing to two image data (still-image data) outputted from the CCD 5 and the CCD 6, and store them to the buffer memory.

Next, the CPU 17 causes the synthesize section 16 to synthesize the stored two still-image data, generates a still-image file by compressing the synthesized single still-image data, and records the generated still-image file to the flash memory 20 (Step S6). Next, the process returns to Step S1.

Since the synthesize section 16 synthesizes still-image data with a large quantity of light (still-image data acquired by the CCD 5) and still-image data with a small quantity of light (still-image data acquired by the CCD 6), it is possible to acquire image data with a wide dynamic range.

On the other hand, if it is judged to start picture recording before the shutter button has been depressed (Y in Step S4), the CPU 17 starts moving picture recording processing (Step S7) of compressing the image data (moving picture data) that are sequentially outputted from the CCD 6 and stored to the buffer memory and recording them in the flash memory 20. Even during this processing, the through-image display of the object is being performed. Therefore, the image data (moving picture data) which is to be through-image displayed is recorded to the flash memory 20.

After starting the moving picture recording processing, the CPU 17 judges whether or not the shutter button has been depressed by the user (Step S8).

If judged that the shutter button has not been depressed in Step S8, it is judged whether or not to end picture recording (Step S9), and if judged not to end picture recording, the process returns to Step S8. The judgment whether or not to end picture recording is made based on whether or not a manipulation signal corresponding to the depression of the record button has been sent from the key input section 19. In other words, if the record button is depressed while picture recording is not being performed, it is judged to start picture recording, and if the record button is depressed while picture recording is being performed, it is judged to end picture recording.

If judged that the shutter button has been depressed before ending picture recording (Y in Step S8), still-image photographing and recording processing is performed using the CCD 5 (Step S10), and the process returns to Step S8. In other words, the CCD 5 is driven by driving of reading out charges of all pixels, a still-image file is generated by compressing the still-image data read out from the CCD 5, and the generated still-image file is recorded to the flash memory 20. Although the quantity of light incident to the CCD 5 is reduced by the spectroscopy section, the quantity of object light projected to the CCD 5 is four fifths of the quantity of light incident to the spectroscopy section. Therefore, the quantity of light is not very much reduced and thus a beautiful still-image data can be acquired.

Note that even during the still-image photographing and recording processing based on the CCD 5, the image data (moving picture data) read out by pixel addition driving of the CCD 6 is displayed in the display section 15 and stored to the flash memory 20.

On the other hand, if judged that the shutter button has not been depressed and judged to end picture recording (Y in Step S9), the CPU 17 ends recording processing of the moving picture data imaged by the CCD 6 and generates a moving picture file based on the moving picture data stored to the flash memory 20 (Step 11). Next, the process returns to Step S1.

C. Effect As described above, according to the embodiment, the spectroscopy means for splitting the quantity of object light into two at a certain rate (4 to 1) and two image pick-up elements are provided, and the moving picture image (through image) of the object is imaged by pixel addition driving of the CCD to which a smaller quantity of light is projected. Therefore, the electric charges of pixels are less likely to become saturated and it is possible to increase a frame rate.

Furthermore, since the saturated state is less likely to occur even by pixel addition driving, there is no need to shorten the exposure time and a natural and smooth through image (moving picture image) can be displayed.

Still further, since only one of the CCDs is driven during the through-image display and during the moving picture recording, the power consumption can be reduced.

Still further, during the still-image photographing and recording, a still-image is photographed using a CCD to which a larger quantity of light is projected and a CCD to which a smaller quantity of light is projected, and the still-image data acquired by the CCD with a larger quantity of light and the still-image data acquired by the CCD with a smaller quantity of light are synthesized and recorded. Therefore, image data with a wide dynamic range can be recorded.

D. Modification

A modification as described below is also possible for the embodiment as described above.

In the modification, in the case where the quantity of object light incident to the image pickup lens 2 is sufficient (the quantity is large), a moving picture image (including a through image) of the object is imaged by pixel addition driving of the pickup element with a smaller quantity of light. On the other hand, in the case where the quantity of object light incident to the image pickup lens 2 is insufficient (the quantity is small), a moving picture image of the object is imaged by pixel addition driving of the pickup element with a larger quantity of light.

Hereafter, the operation of the digital camera 1 in the modification will be explained according to the flowchart in FIG. 3. Explanation on similar processing as that in the embodiment described above will be omitted herein.

Figure 3:
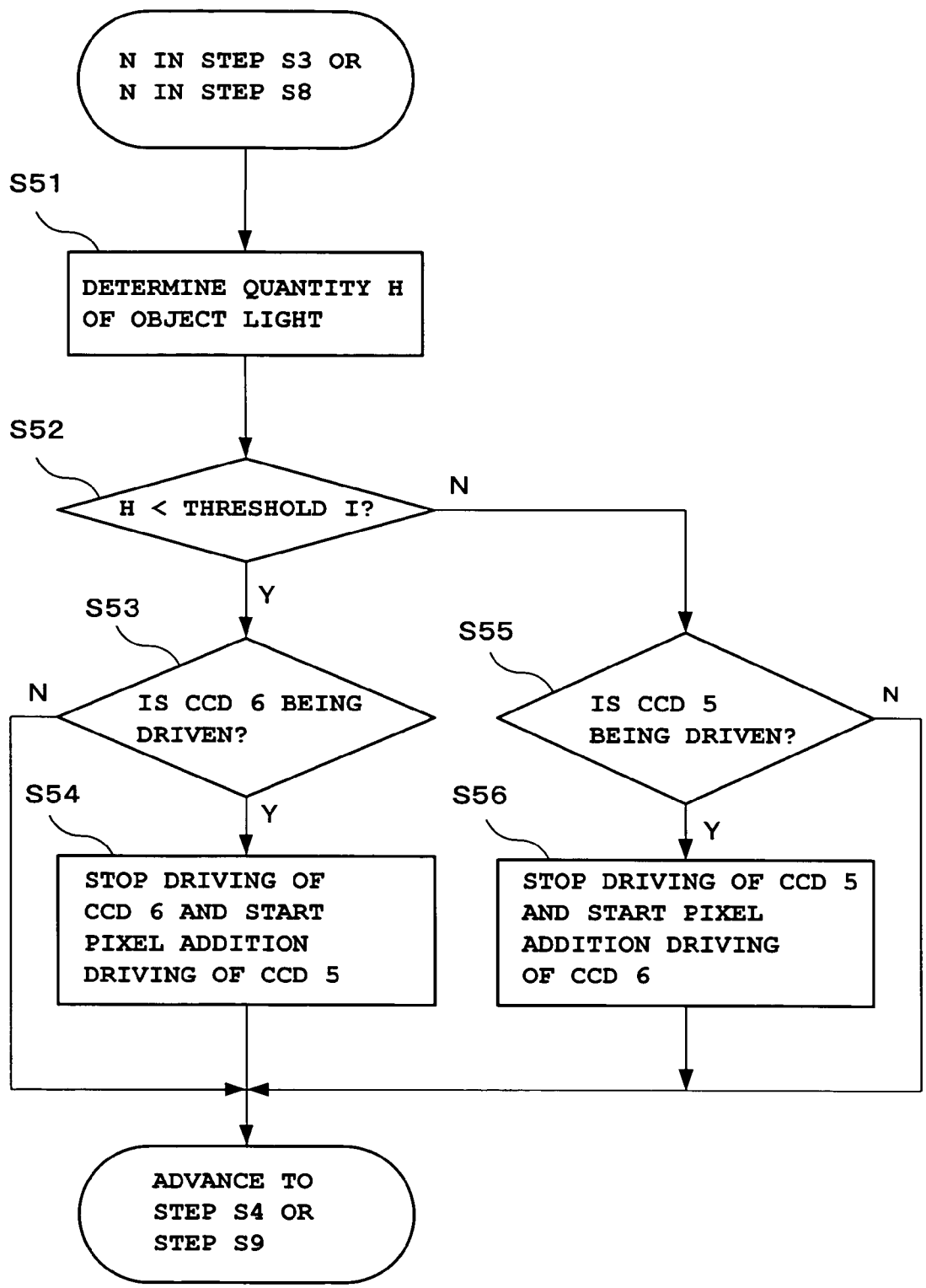
FIG. 3 is a flowchart showing an operation of the digital camera according to a modification.

If judged that the shutter button has not been depressed in Step S3, or if judged that the shutter button has not been depressed in Step S8, the process advances to Step S51 in FIG. 3 where the CPU 17 determines the quantity of object light H incident to the image pickup lens 2. The determination of quantity of light H is based on the quantity of electric charges accumulated in the CCD 5 or the CCD 6. When the CCD 5 is currently being driven, the quantity of object light H is determined based on the image data read out from the CCD 5, and when the CCD 6 is currently being driven, the quantity of object light H is determined based on the image data read out from the CCD 6.

Determination of the quantity of object light H will now be specifically explained. When the quantity of object light H is determined based on the image data read out from the CCD 5, the quantity of light P projected to the CCD 5 is four fifths of the quantity of object light H incident to the image pickup lens 2, which is taken into consideration in determining quantity of light H. In other words, quantity of light H to be determined is the quantity of light P×5/4.

On the other hand, when the quantity of object light H is determined based on the image data read out from the CCD 6, the quantity of light Q projected to the CCD 6 is one fifth of the quantity of object light H incident to the image pickup lens 2, which is taken into consideration in determining quantity of light H. In other words, quantity of light H to be determined is the quantity of light Q×5/1.

Next, the CPU 17 judges whether or not the determined quantity of light H is smaller than a threshold I (Step S52). The threshold I serves as a reference value for judging whether the quantity of light incident to the image pickup lens 2 is large or small.

If judged that the determined quantity of light H is smaller than the threshold I, CPU 17 judges that the quantity of light incident to the image pickup lens 2 is small, and then the CPU 17 judges whether or not the CCD 6 is being driven by pixel addition driving (Step S53).

If judged that the CCD 6 is not being driven by pixel addition driving in Step S53, the CPU 17 stops driving of the CCD 6 and starts driving of the CCD 5 by pixel addition driving of the CCD 5 (Step S54). Next, the process advances to Step S4 or Step S9 in FIG. 2.

On the other hand, if judged that the CCD 6 is not being driven by pixel addition driving in Step S53, the CPU 17 judges that the CCD 5 is driven by pixel addition driving. Next, the process advances to Step S4 or Step S9 in FIG. 9 as it is.

Accordingly, in the case where the quantity of object light H is small, since the CCD 5 to which a large quantity of light is projected is driven by pixel addition driving, it is possible to acquire a moving picture which does not suffer from in sufficient quantity of light and to increase the frame rate. In addition, the quantity of object light H is inherently small. Therefore, even if the CCD 5 to which a large quantity of light is projected is driven by pixel addition driving, the saturated state is less likely to occur.

On the other hand, if judged that the determined quantity of light H is larger than the threshold I in Step S52, it is judged that the quantity of light incident to the image pickup lens 2 is large. Next, the CPU 17 judges whether or not the CCD 5 is currently driven by pixel addition driving (Step S55).

If judged that the CCD 5 is currently being driven by pixel addition driving in Step S55, driving of the CCD 5 is stopped, and driving of the CCD 6 is started by pixel addition driving of the CCD 6 (Step S56). Next, the process advances to Step S4 or Step S9 in FIG. 2.

On the other hand, if judged that the CCD 5 is not currently being driven by pixel addition driving in Step S55, it is judged that the CCD 6 is being driven by pixel addition driving. Next, the process advances to Step S4 or Step S9 in FIG. 2 as it is.

Accordingly, in the case where the quantity of object light H is large, the CCD 6 to which a small quantity of light is projected is being driven by pixel addition driving. Therefore, the saturated state is less likely to occur, and it is possible to increase the frame rate.

As described above, selecting the CCD to be driven based on whether the quantity of object light H is larger or smaller than the threshold I (whether or not the quantity of object light is sufficient), it is possible to increase the frame rate while avoiding the saturated state, thereby acquiring a moving picture image with an adequate exposure amount.

Note that in the embodiment as described above and the modification, the number of pixels to be added by pixel addition driving may be increased or decreased in accordance with the quantity of incident object light. For example, in the case where the quantity of object light is small, it is possible to prevent insufficient quantity of light by increasing the number of pixels to be added, and in the case where the quantity of object light is large, it is possible to prevent the saturated state from occurring by decreasing the number of pixels to be added.

Figure 2:
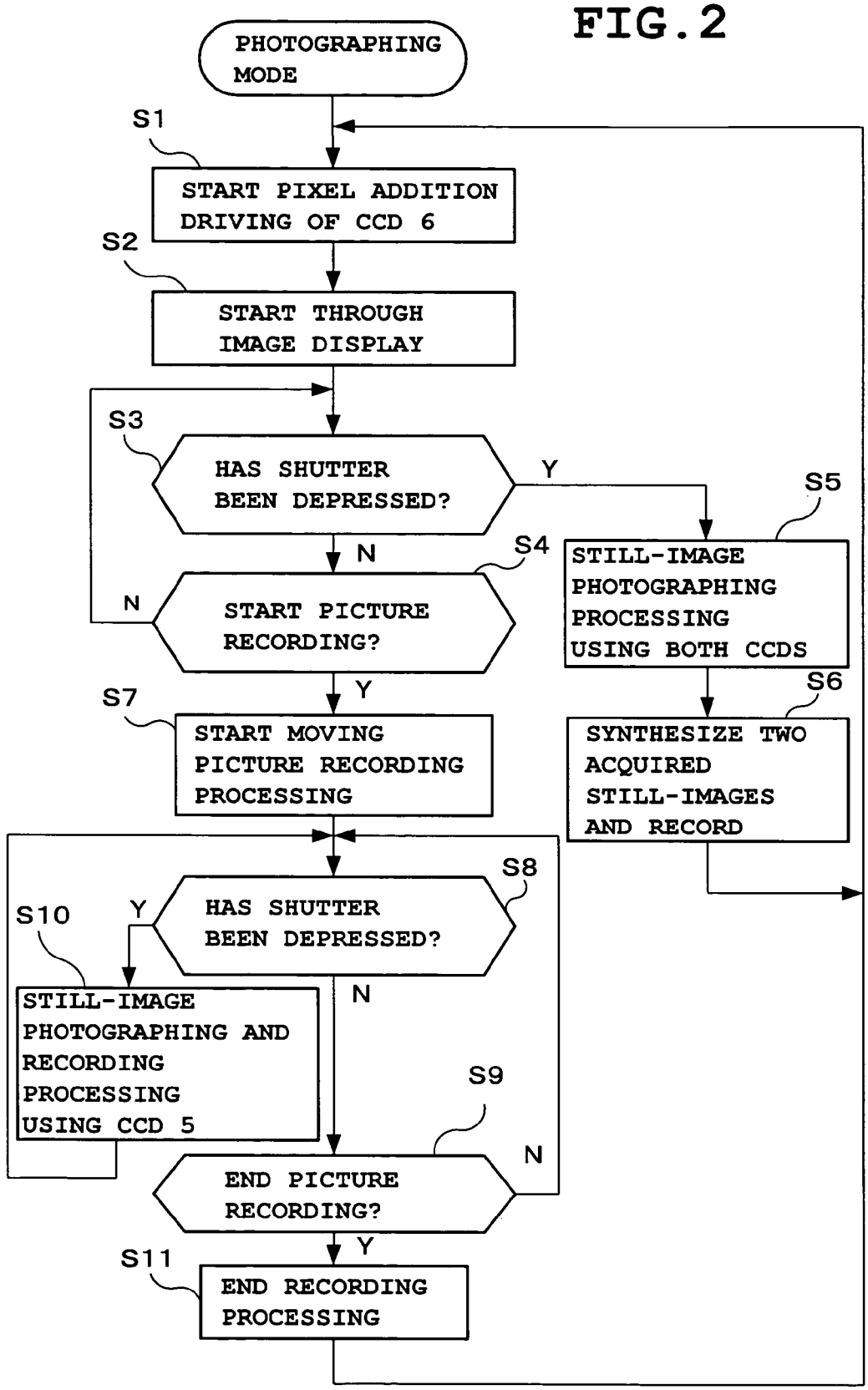
FIG. 2 is a flowchart showing an operation of the digital camera according to the embodiment.

Furthermore, the still-image photographing processing in Step S5 in FIG. 2 is performed using both CCDs. However, the still-image photographing processing may be performed using the other CCD which is not used for imaging a moving picture (imaging a through image). In this case, in place of the processing of Step S5 and Step S6, the same processing as that in Step S10 is performed.

Still further, in the case where the moving picture recording processing is performed, still-image photographing of the object maybe omitted. In other words, Step S8 and Step S10 in FIG. 2 are deleted, and the process advances to Step S9 as it is after starting the moving picture recording processing in Step S7.

Still further, the CCD to be driven for imaging a moving picture is switched based on whether or not the quantity of object light H is larger than the threshold I in the modification. This switching may have hysteresis.

For example, in the case switching the CCD to be driven from the CCD 6 to the CCD 5, the switching from the CCD 6 to the CCD 5 is made when the quantity of object light H becomes smaller than the threshold I–a predetermined value J. In the case where switching the CCD to be driven from the CCD 5 to the CCD 6, switching from the CCD 5 to the CCD 6 is made when the quantity of object light H becomes larger than the threshold I+the predetermined value J.

Furthermore, in the modification, in the case where the shutter button has been depressed during the moving picture recording processing (Y in Step S8 in FIG. 2), a still-image may be photographed using a CCD which is not driven by pixel addition driving. Alternatively, still-image photographing may be prohibited during the moving picture recording processing.

Still further, the digital camera 1 in the above-described embodiment and modification is not limited to the embodiment as described above. The digital camera 1 may be a cell phone with camera, a PDA with camera, a PC with camera, an IC recorder with camera or a digital video camera, or any apparatus capable of photographing an object.

Furthermore, although the imaging program of the digital camera 1 which is a preferred embodiment of the present invention is stored in the memory (for example, ROM, etc.) of the digital camera 1, this imaging program is stored on a computer-readable medium and should also be protected in the case of manufacturing, selling, etc. of only the program. In that case, the method of protecting the program with a patent will be realized by the form of the computer-readable medium on which the imaging program is stored.

While the present invention has been described with reference to the preferred embodiments, it is intended that the invention be not limited by any of the details of the description therein but includes all the embodiments which fall within the scope of the appended claims.

What is claimed is:

1. An imaging apparatus comprising:
a spectroscopy section for splitting a beam of object light asymmetrically;
a first image pickup element for converting to image data a first one of the split object lights from the spectroscopy section;
a second image pickup element for converting to image data a second one of the split object lights from the spectroscopy section;
a moving picture imaging control section for imaging a moving picture of an object by pixel addition driving of only one of the image pickup elements, among the first and second image pickup elements;
a first still-image photographing control section for photographing a still image of the object using the first image pickup element and the second image pickup element;
a first recording control section for generating single still-image data by synthesizing still-image data acquired by the first image pickup element and still-image data acquired by the second image pickup element according to the first still-image photographing control section and for recording the generated single still-image data to a record section; and
a judgment section for judging whether or not a quantity of the object light is large, based on a threshold;
wherein the moving picture imaging control section images the moving picture of the object by pixel addition driving of only the image pickup element which converts to image data the split object light with a smaller quantity of light of the split object lights from the spectroscopy section if the judgment section judges that the quantity of the object light is large, and wherein the moving picture imaging control section images the moving picture of the object by pixel addition driving of only the image pickup element which converts to image data the split object light with a larger quantity of light of the split object lights from the spectroscopy section if the judgment section judges that the quantity of the object light is not large.

2. The imaging apparatus according to claim 1, wherein the moving picture imaging control section comprises a section for prohibiting imaging of a moving picture in a case in which the first still-image photographing control section photographs a still image of the object.

3. The imaging apparatus according to claim 1, further comprising:
a display control section for displaying moving picture data acquired by the moving picture imaging control section on a display section.

4. The imaging apparatus according to claim 1, further comprising:
a second recording control section for recording moving picture data acquired by the moving picture imaging control section to the record section.

5. The imaging apparatus according to claim 4, further comprising:
a moving picture recording instruction section for providing an instruction to start recording of a moving picture;
wherein the second recording control section starts recording of a moving picture when the moving picture recording instruction section provides the instruction to start recording of a moving picture.

6. The imaging apparatus according to claim 5, wherein the moving picture recording instruction section comprises a section for providing an instruction to end recording of a moving picture; and
wherein the second recording control section ends recording of a moving picture when the moving picture recording instruction section gives the instruction to end recording of the moving picture.

7. The imaging apparatus according to claim 1, further comprising:
a second still-image photographing control section for photographing a still image of the object using only the other image pickup element, which is not used for imaging a moving picture, while imaging of a moving picture is performed by the moving picture imaging control section, and recording still-image data acquired by the other image pickup element to the record section.

8. The imaging apparatus according to claim 7, further comprising:
a second recording control section for recording the moving picture data acquired by the moving picture imaging control section;
wherein in a case in which the moving picture data acquired by the moving picture imaging control section has been recorded by the second recording control section, the second still-image photographing control section photographs a still image of the object using only the other image pickup element, which is not used for imaging the moving picture, and records still-image data acquired by the other image pickup element to the record section.

9. The imaging apparatus according to claim 7, further comprising:
a still-image imaging instruction section for providing an instruction to image a still image;
wherein in a case in which the still-image imaging instruction section provides the instruction to image a still image while imaging of a moving picture is performed by the moving picture imaging control section, the second still-image photographing control section photographs a still image of the object using only the other image pickup element, which is not used for imaging a moving picture, and records the still-image data acquired by the other image pickup element to the record section.

10. The imaging apparatus according to claim 1, further comprising:
a moving picture imaging instruction section for providing an instruction to start imaging of a moving picture;
wherein the moving picture imaging control section starts imaging of a moving picture when the moving picture imaging instruction section provides the instruction to start imaging of a moving picture.

11. The imaging apparatus according to claim 1, further comprising:
a still-image imaging instruction section for providing an instruction to image a still image;
wherein the first still-image imaging control section photographs a still image of the object using the first image pickup element and the second image pickup element when the still-image imaging instruction section provides the instruction to image a still image.

12. An imaging method for an imaging apparatus comprising (i) a spectroscopy section for splitting a beam of object light asymmetrically, (ii) a first image pickup element for converting to image data a first one of the split object lights from the spectroscopy section, and (iii) a second image pickup element for converting to image data a second one of the split object lights from the spectroscopy section, the method comprising:
imaging a moving picture of an object by pixel addition driving of only one of the image pickup elements, among the first and second image pickup elements;
photographing a still image of the object using the first image pickup element and the second image pickup element;
generating single still-image data by synthesizing still-image data acquired by the first image pickup element and still-image data acquired by the second image pickup element when photographing the still image, and recording the generated single still-image data to a recording medium; and
judging whether or not a quantity of the object light is large, based on a threshold;
wherein the imaging of the moving picture of the object is performed by pixel addition driving of only the image pickup element which converts to image data the split object light with a smaller quantity of light of the split object lights if it is judged that the quantity of the object light is large, and the imaging of the moving picture of the object is performed by pixel addition driving of only the image pickup element which converts to image data the split object light with a larger quantity of light of the split object lights if it is judged that the quantity of the object light is not large.

13. A non-transitory computer readable recording medium having a program stored thereon which is executable by a processor in an imaging apparatus comprising (i) a spectroscopy section for splitting a beam of object light asymmetrically, (ii) a first image pickup element for converting to image data a first one of the split object lights from the spectroscopy section, and (iii) a second image pickup element for converting to image data a second one of the split object lights from the spectroscopy section, the program being executable to cause the imaging apparatus to perform functions comprising:
imaging a moving picture of an object by pixel addition driving of only the one of the image pickup elements, among the first and second image pickup elements;
photographing a still image of the object using the first image pickup element and the second image pickup element;
generating single still-image data by synthesizing still-image data acquired by the first image pickup element and still-image data acquired by the second image pickup element when photographing the still image, and recording the generated single still-image data to a recording medium; and
judging whether or not a quantity of the object light is large, based on a threshold;
wherein the imaging of the moving picture of the object is performed by pixel addition driving of only the image pickup element which converts to image data the split object light with a smaller quantity of light of the split object lights if it is judged that the quantity of the object light is large, and the imaging of the moving picture of the object is performed by pixel addition driving of only the image pickup element which converts to image data the split object light with a larger quantity of light of the split object lights if it is judged that the quantity of the object light is not large.

* * * * *